US011269195B2

(12) United States Patent
Sue et al.

(10) Patent No.: US 11,269,195 B2
(45) Date of Patent: Mar. 8, 2022

(54) OPTICAL UNIT WITH SHAKE CORRECTION FUNCTION

(71) Applicant: NIDEC SANKYO CORPORATION, Nagano (JP)

(72) Inventors: Takeshi Sue, Nagano (JP); Shinji Minamisawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 215 days.

(21) Appl. No.: 16/830,269

(22) Filed: Mar. 26, 2020

(65) Prior Publication Data

US 2020/0310153 A1     Oct. 1, 2020

(30) Foreign Application Priority Data

| Mar. 28, 2019 | (JP) | JP2019-062236 |
| Mar. 28, 2019 | (JP) | JP2019-062237 |
| Mar. 28, 2019 | (JP) | JP2019-062238 |
| Mar. 28, 2019 | (JP) | JP2019-062239 |
| Oct. 11, 2019 | (JP) | JP2019-187558 |

(51) Int. Cl.
  *G02B 27/64* (2006.01)
  *G03B 5/06* (2021.01)

(52) U.S. Cl.
  CPC ............. *G02B 27/646* (2013.01); *G03B 5/06* (2013.01); *G03B 2205/0023* (2013.01)

(58) Field of Classification Search
  None
  See application file for complete search history.

(56) References Cited

U.S. PATENT DOCUMENTS

| 8,660,416 B2 | 2/2014 | Asakawa et al. |
| 9,219,851 B2 | 12/2015 | Sekimoto |
| 9,599,836 B2 | 3/2017 | Lam |
| 9,759,887 B2 | 9/2017 | Kasuga |
| 9,933,629 B2 | 4/2018 | Minamisawa |
| 10,185,156 B2 | 1/2019 | Minamisawa et al. |
| 10,502,926 B2 | 12/2019 | Shirotori et al. |

(Continued)

FOREIGN PATENT DOCUMENTS

| CN | 103135313 | 6/2013 |
| CN | 104460183 | 3/2015 |

(Continued)

*Primary Examiner* — Derek S. Chapel
(74) *Attorney, Agent, or Firm* — JCIPRNET

(57) ABSTRACT

An optical unit with a shake correction function include a movable body having an optical module and a holder surrounding the optical module, a swing support mechanism swingably supporting the movable body, a fixed body, and a shake correction drive mechanism. The optical module has a protruded part, and the holder has a position restriction part with which the protruded part is abutted. The fixed body includes a case accommodating the holder, and the case includes an outer frame part surrounding the holder and a projecting part projecting to an inner peripheral side from an end part on an image side of the outer frame part. The projecting part has a stopper part overlapping with the holder, and the protruded part and the position restriction part are located on an inner peripheral side with respect to the projecting part when viewed in the optical axis direction.

11 Claims, 10 Drawing Sheets

(56) References Cited

U.S. PATENT DOCUMENTS

| | | | |
|---|---|---|---|
| 10,649,226 B2 | 5/2020 | Minamisawa et al. | |
| 2016/0277684 A1* | 9/2016 | Park | H04N 5/23287 |
| 2017/0017093 A1* | 1/2017 | Minamisawa | G03B 5/06 |
| 2018/0129118 A1 | 5/2018 | Sue et al. | |
| 2018/0252893 A1* | 9/2018 | Park | G03B 3/10 |
| 2020/0049939 A1* | 2/2020 | Lee | G02B 27/646 |

FOREIGN PATENT DOCUMENTS

| | | |
|---|---|---|
| CN | 104620148 | 5/2015 |
| CN | 104969108 | 10/2015 |
| CN | 105247413 | 1/2016 |
| CN | 107092066 | 8/2017 |
| CN | 107664800 | 2/2018 |
| CN | 107957616 | 4/2018 |
| CN | 108073011 | 5/2018 |
| CN | 109212865 | 1/2019 |
| JP | 2014006522 | 1/2014 |
| JP | 2017016114 | 1/2017 |
| JP | 2019070865 | 5/2019 |
| KR | 101813392 B1 * | 12/2017 |

\* cited by examiner

OPTICAL UNIT WITH SHAKE CORRECTION FUNCTION

CROSS REFERENCE TO RELATED APPLICATION

The present application claims priority under 35 U.S.C. § 119 to Japanese Application No. 2019-062236 filed on Mar. 28, 2019, Japanese Application No. 2019-062237 filed on Mar. 28, 2019, Japanese Application No. 2019-062238 filed on Mar. 28, 2019, Japanese Application No. 2019-062239 filed on Mar. 28, 2019, Japanese Application No. 2019-187558 filed on Oct. 11, 2019 and the entire content of which is incorporated herein by reference.

TECHNICAL FIELD

The present disclosure relates to an optical unit with a shake correction function structured to perform a shake correction of an optical module.

BACKGROUND

An optical unit which is mounted on a portable terminal or a movement body may include a mechanism structured to swing or turn a movable body on which an optical module is mounted to correct a shake in order to restrain disturbance of a photographed image of the portable terminal or when the movement body is moved. Such an optical unit with a shake correction function is disclosed in Japanese Patent Laid-Open No. 2014-006522 (Patent Literature 1). An optical unit disclosed in Patent Literature 1 includes a movable body structured to accommodate an imaging unit in an inside of a box-shaped cover, a fixed body, a gimbal mechanism which swingably supports the movable body with respect to the fixed body, and a shake correction drive mechanism structured to swing the movable body.

The shake correction drive mechanism is a magnetic drive mechanism which includes a magnet and a coil, and one of the magnet and the coil is fixed to the movable body, and the other is fixed to the fixed body. For example, a magnet is fixed to a side face of a cover which accommodates an imaging unit. Further, in Patent Literature 1, as another structure of a movable body, a structure is disclosed in which a coil is fixed to a holder which holds a lens barrel of an imaging unit.

In an optical unit with a shake correction function, a movable body includes a holding member such as a cover or a holder to which a magnet or a coil of a shake correction drive mechanism is fixed, and an imaging unit (optical module) is positioned in an optical axis direction with respect to the holding member. For example, a top surface of the imaging unit is formed to be an abutting face, and the top surface of the imaging unit is abutted with the holding member such as a holder from a rear side (image side) in the optical axis direction and thereby positioning in the optical axis direction is performed.

However, in a structure that positioning in the optical axis direction is performed with the top surface of the imaging unit (optical module) as the abutting face, the abutting face which is a positioning reference is located at a position largely separated from a turning center (swing center) of the movable body in the optical axis direction. Therefore, a variation of a gravity center position of the movable body is large.

On the other hand, when an abutting part which is to be abutted in the optical axis direction is formed in a portion other than the top surface of the imaging unit (optical module), a positioning reference can be brought close to a turning center (swing center) of the movable body. For example, when a protruded part protruding to an outer peripheral side is formed in an optical module to set the protruded part to be a positioning reference, a portion other than the top surface can be used as a positioning reference. However, in a case that a protruded part protruding to an outer peripheral side is provided, when an optical unit with a shake correction function is to be assembled, an optical module is unable to be mounted in a direction that the protruded part and components on a fixed body side are interfered with each other.

The present disclosure provides an optical unit with a shake correction function which is capable of bringing a positioning reference in an optical axis direction of an optical module close to a turning center of a movable body and avoiding an interference of the positioning reference of the optical module with a component of the fixed body.

SUMMARY

The present disclosure provides an optical unit with a shake correction function including a movable body having an optical module and a holder surrounding an outer peripheral side of the optical module, a swing support mechanism structured to swingably support the movable body around a first axial line intersecting an optical axis and swingably support the movable body around a second axial line intersecting the optical axis and the first axial line, a fixed body which supports the movable body through the swing support mechanism, and a shake correction drive mechanism structured to swing the movable body around the first axial line and around the second axial line. The optical module includes a protruded part protruding to an outer peripheral side, the holder includes a position restriction part with which the protruded part is abutted in an optical axis direction, and the fixed body includes a case which accommodates the holder. The case includes an outer frame part surrounding an outer peripheral side of the holder and a projecting part projecting to an inner peripheral side from an end part on an image side in the optical axis direction of the outer frame part, the projecting part includes a stopper part overlapping with the holder when viewed in the optical axis direction, and the protruded part and the position restriction part are located on an inner peripheral side with respect to the projecting part when viewed in the optical axis direction.

Other features and advantages of the disclosure will be apparent from the following detailed description, taken in conjunction with the accompanying drawings that illustrate, by way of example, various features of embodiments of the disclosure.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

Figure 8:
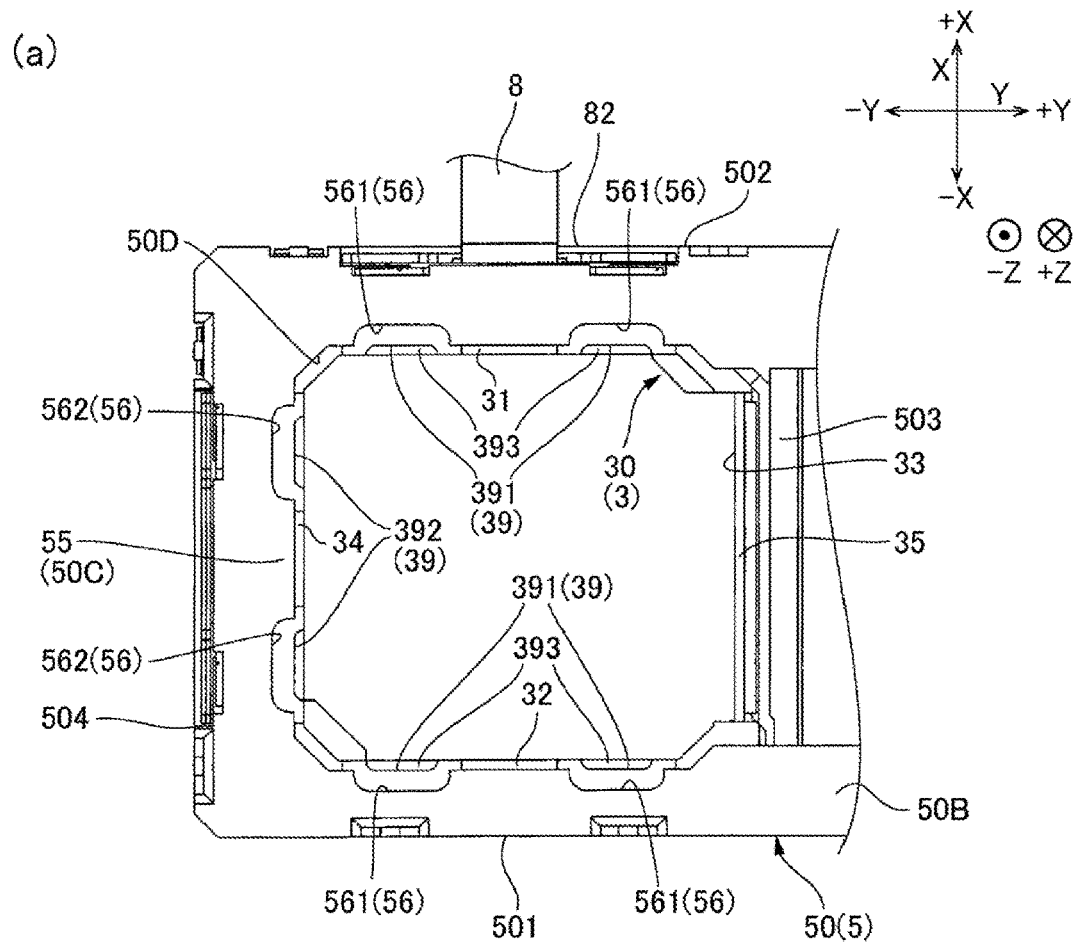
Figure 8:
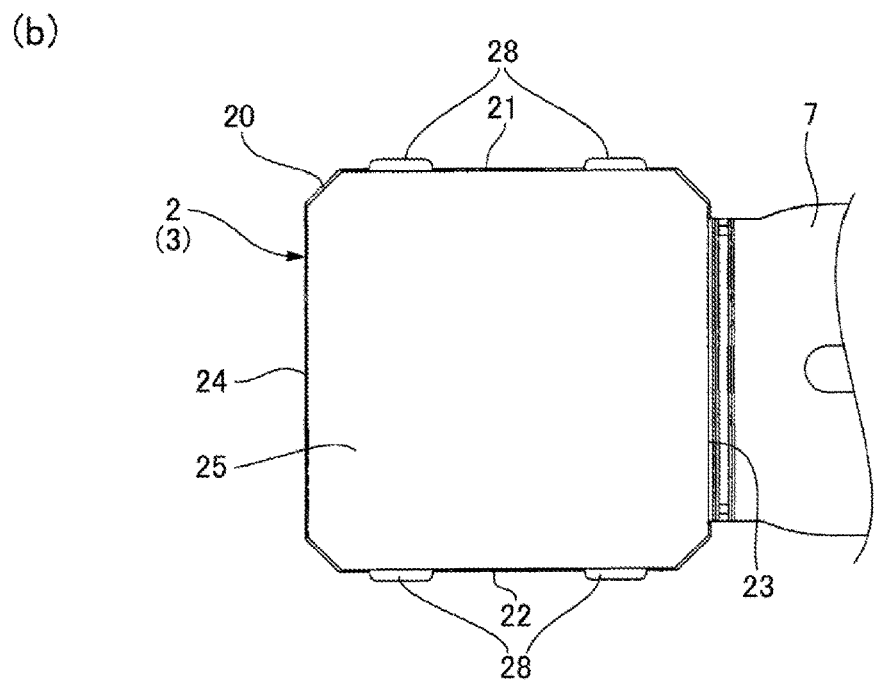

(a) of FIG. 8 is a bottom view showing a fixed body and a holder in which a second cover is detached, and (b) of FIG. 8 is a bottom view showing an optical module.

Figure 9:
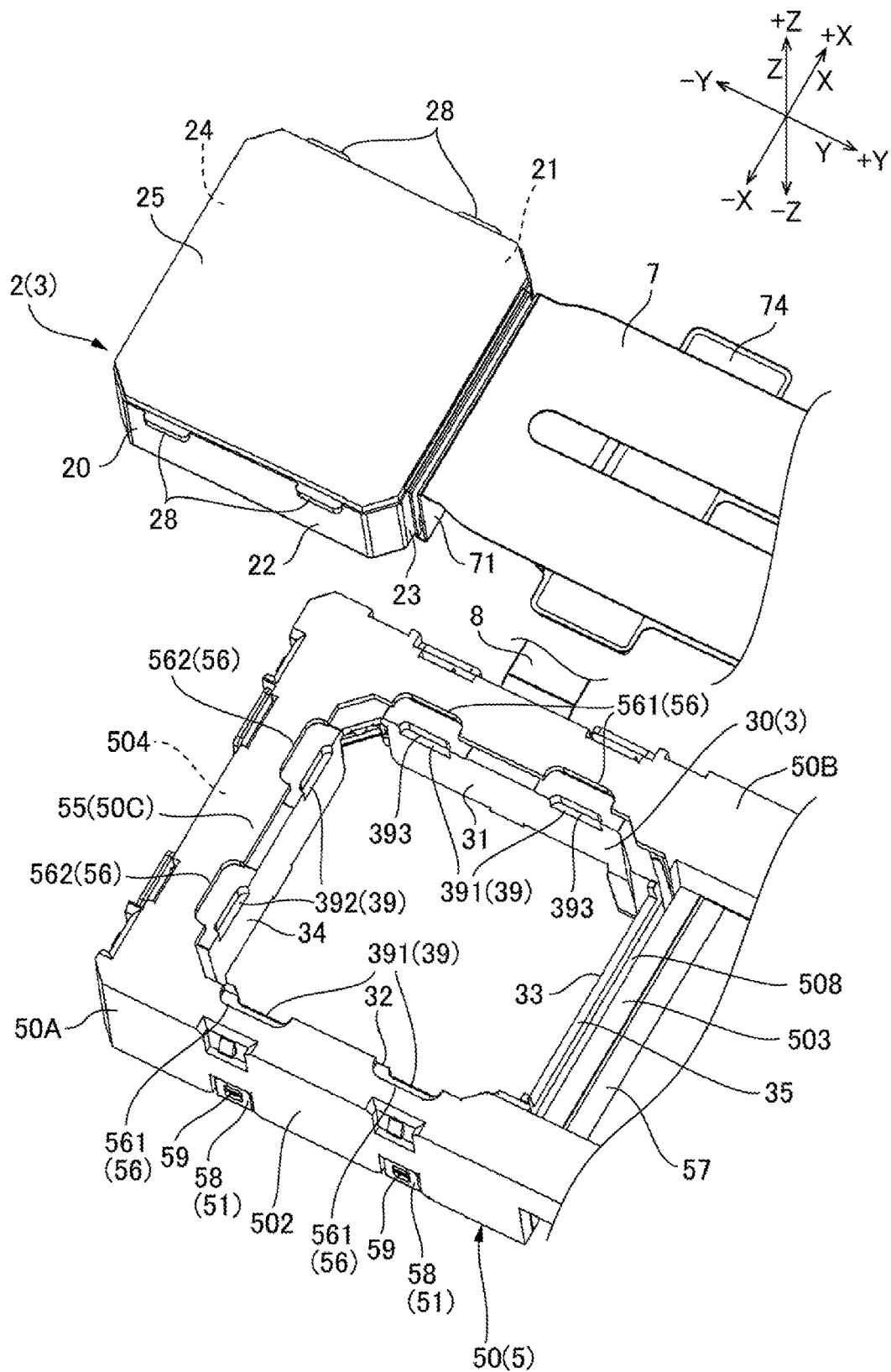

FIG. 9 is a perspective view showing a fixed body, a holder and an optical module in which a second cover is detached and which is viewed from an image side.

Figure 1:
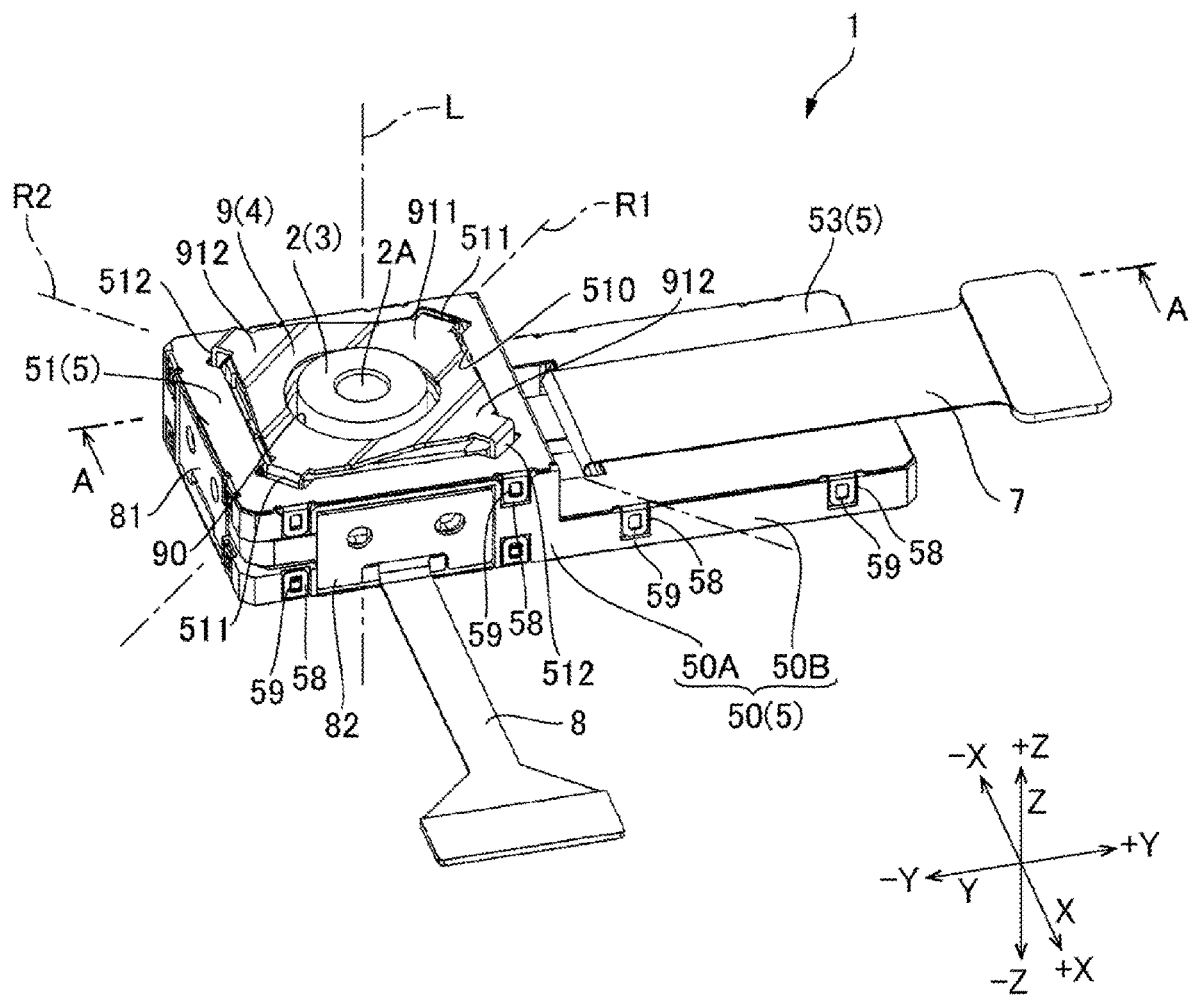
FIG. 1 is an outward perspective view showing an optical unit with a shake correction function in accordance with an embodiment of the present disclosure.
Figure 7:
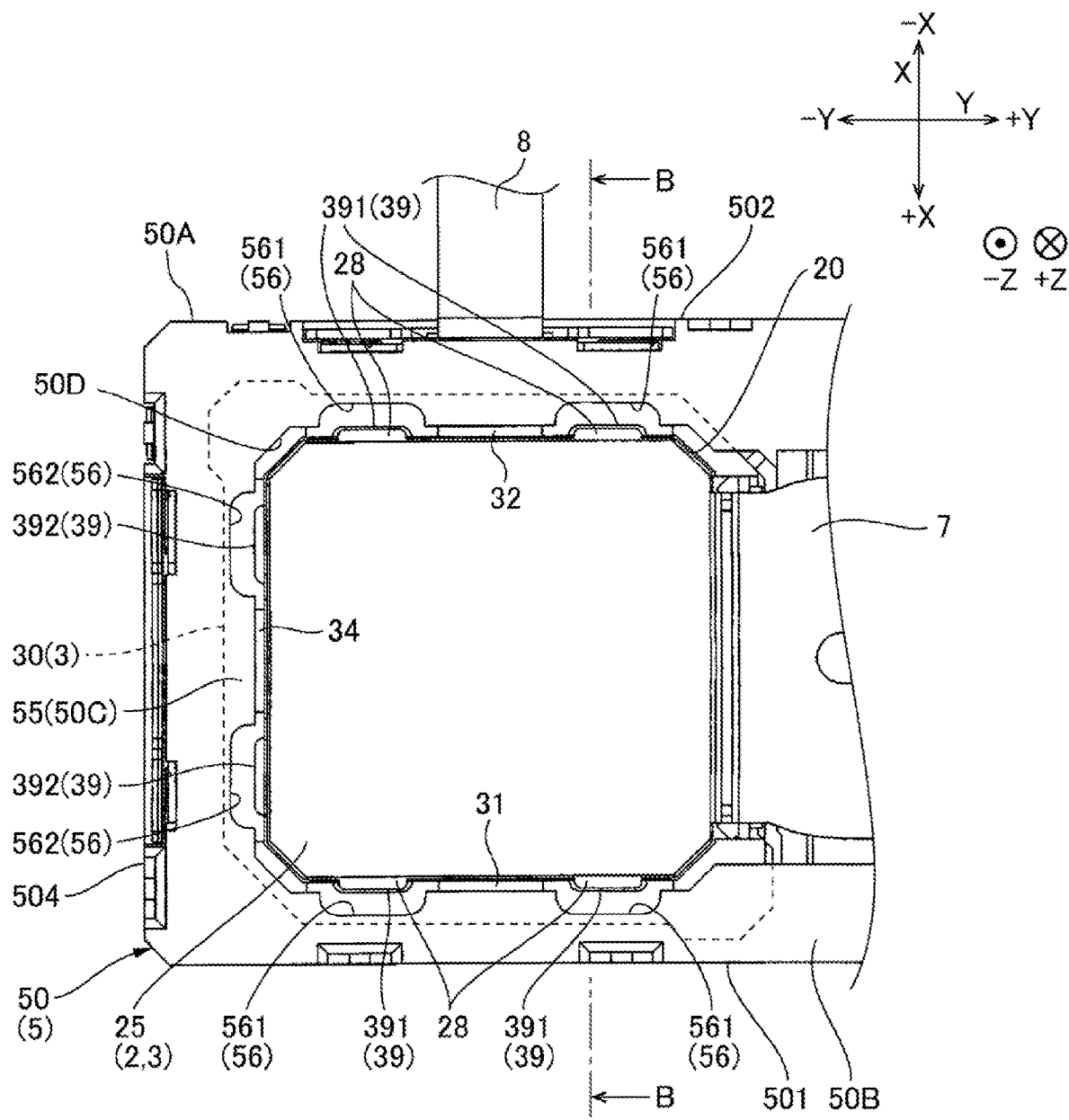
FIG. 7 is a bottom view showing an optical unit with a shake correction function in which a second cover is detached.
Figure 10:
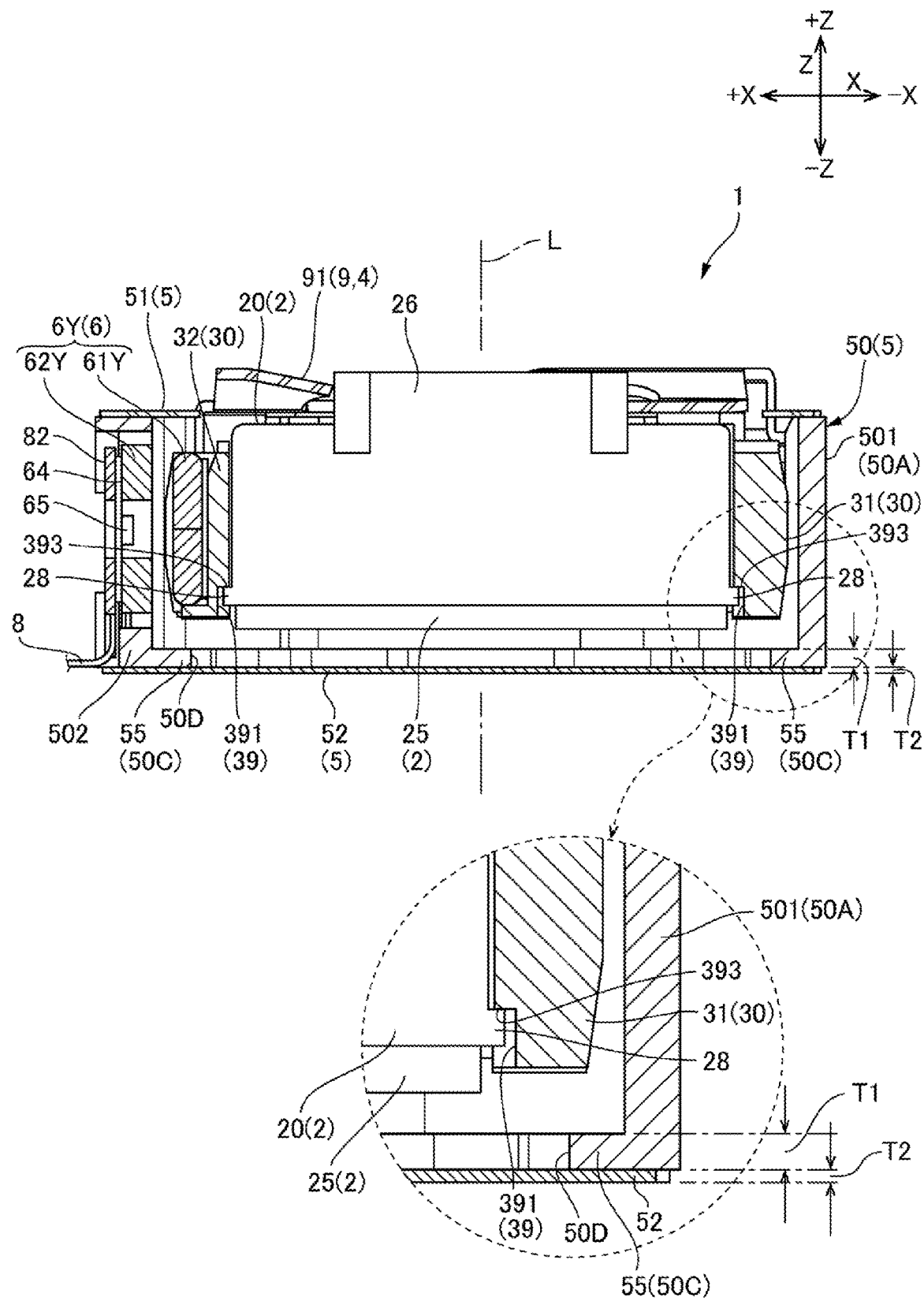

FIG. 10 is a cross-sectional view showing the optical unit with a shake correction function in FIG. 1 (cross-sectional view which is cut at the "B-B" position in FIG. 7).

DETAILED DESCRIPTION

An embodiment of an optical unit 1 with a shake correction function to which the present disclosure is applied will be described below with reference to the accompanying drawings. In the present specification, three axes of "X", "Y" and "Z" are axial line directions perpendicular to each other, and one side in the "X"-axis direction is indicated with "+X" and the other side is indicated with "−X", one side in the "Y"-axis direction is indicated with "+Y", the other side is indicated with "−Y", and one side in the "Z"-axis direction is indicated with "+Z" and the other side is indicated with "−Z". The "Z"-axis direction is coincided with an optical axis "L" direction of an optical module 2. Therefore, the "+Z" direction is one side in the optical axis "L" direction and is an object side. Further, the "−Z" direction is the other side in the optical axis "L" direction and is an image side.

(Entire Structure)

Figure 2:
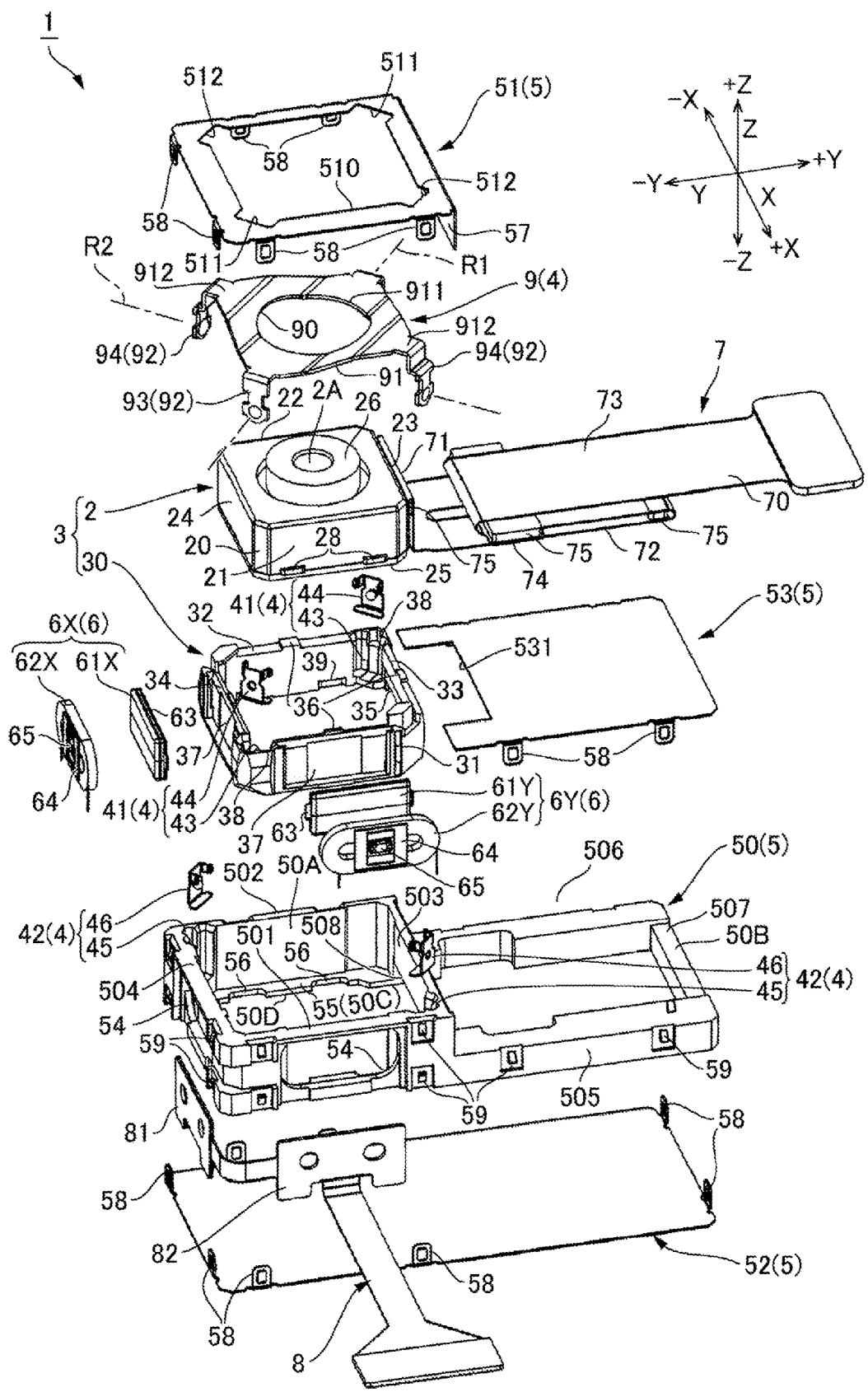
FIG. 2 is an exploded perspective view showing the optical unit with a shake correction function in FIG. 1 which is viewed from an object side.
Figure 3:
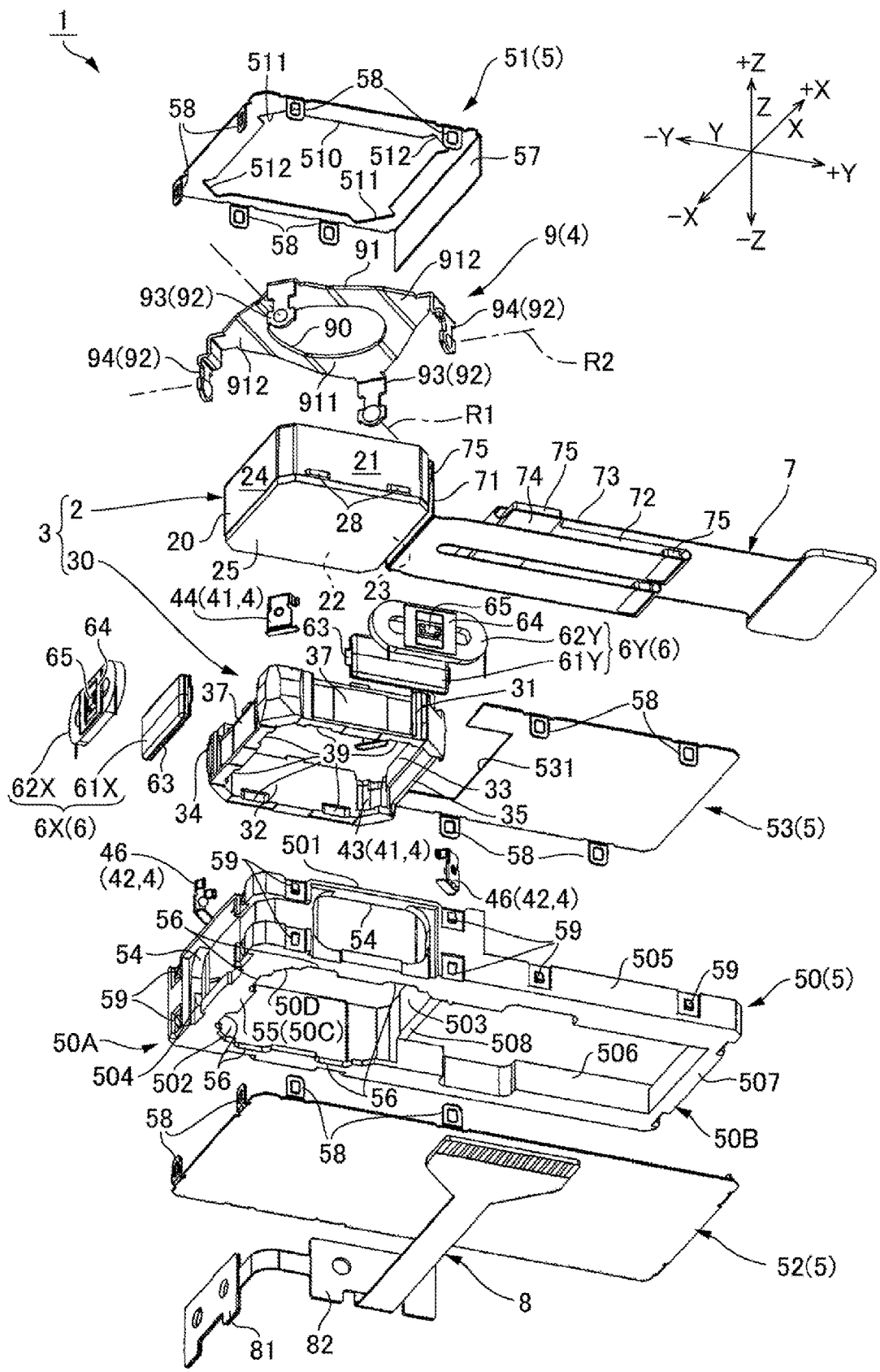
FIG. 3 is an exploded perspective view showing the optical unit with a shake correction function in FIG. 1 which is viewed from an image side.
Figure 4:
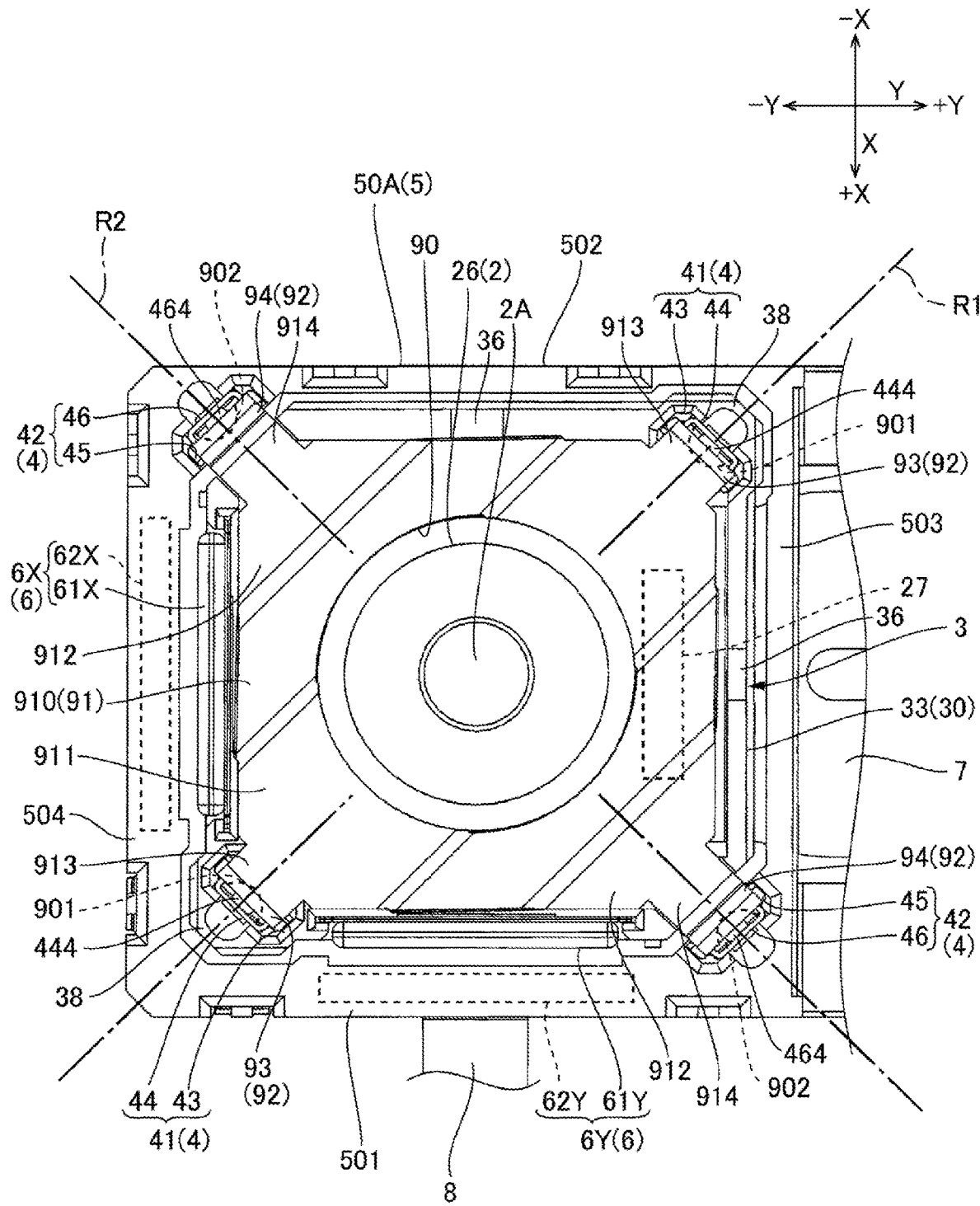
FIG. 4 is a plan view showing an optical unit with a shake correction function in which a first cover is detached.
Figure 5:
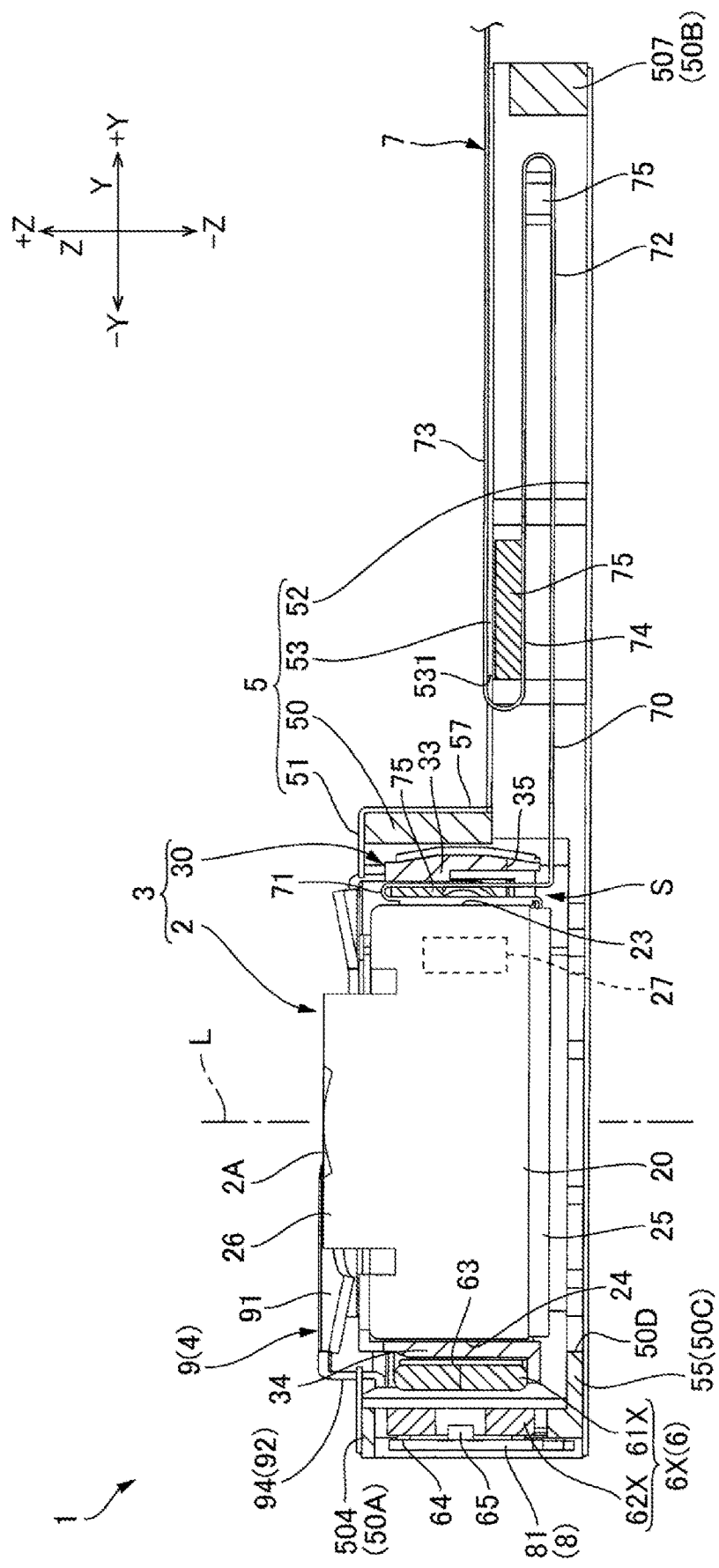
FIG. 5 is a cross-sectional view showing the optical unit with a shake correction function in FIG. 1 (cross-sectional view which is cut at the "A-A" position in FIG. 1).
Figure 6:
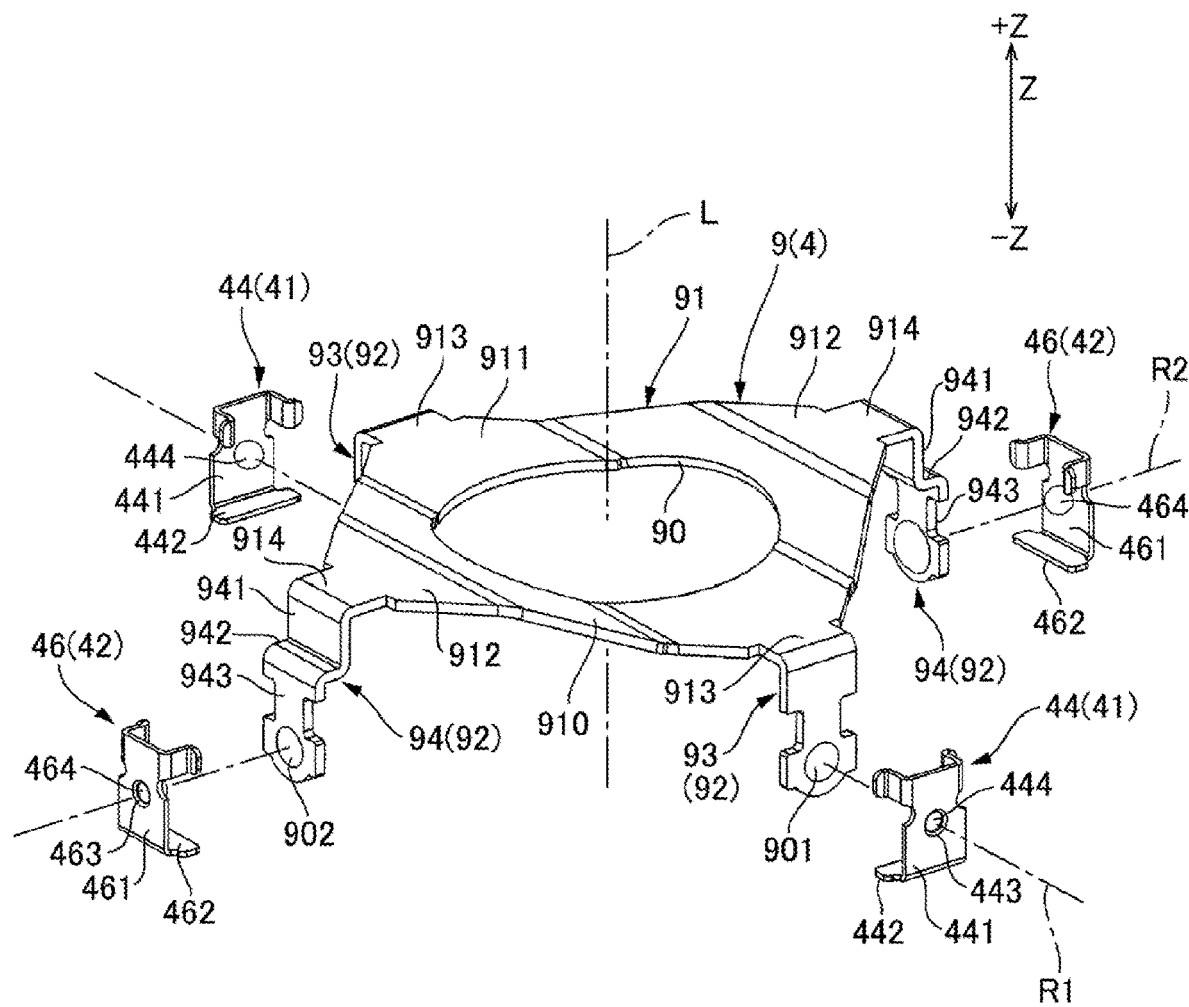
FIG. 6 is an exploded perspective view showing a gimbal frame, first thrust receiving members and second thrust receiving members.

FIG. 1 is a perspective view showing an optical unit 1 with a shake correction function to which the present disclosure is applied. FIG. 2 is an exploded perspective view showing the optical unit 1 with a shake correction function in FIG. 1 which is viewed from an object side ("+Z" direction). FIG. 3 is an exploded perspective view showing the optical unit 1 with a shake correction function in FIG. 1 which is viewed from an image side ("−Z" direction). FIG. 4 is a plan view showing the optical unit 1 with a shake correction function in which a first cover 51 is detached, and FIG. 4 is a plan view which is viewed from an object side ("+Z" direction). FIG. 5 is a cross-sectional view showing the optical unit 1 with a shake correction function in FIG. 1 (cross-sectional view which is cut at the "A-A" position in FIG. 1). FIG. 6 is an exploded perspective view showing a gimbal frame 9, first thrust receiving members 44 and second thrust receiving members 46.

As shown in FIG. 1, an optical unit 1 with a shake correction function includes an optical module 2 having an optical element such as a lens. The optical unit 1 with a shake correction function is, for example, used in an optical device such as a cell phone with a camera and a drive recorder or in an optical device such as an action camera mounted on a movement body such as a helmet, a bicycle, or a radio-controlled helicopter or a wearable camera. In the optical device, when a shake is occurred in the optical device at the time of photographing, disturbance is generated in a photographed image. In order to avoid a photographed image being inclined, the optical unit 1 with a shake correction function corrects an inclination of the optical module 2 based on acceleration, turning speed, shaking amount and the like detected by a detection means such as a gyroscope.

As shown in FIGS. 1 through 5, the optical unit 1 with a shake correction function includes a movable body 3 on which the optical module 2 is mounted, a gimbal mechanism 4 structured to swingably support the movable body 3, a fixed body 5 which supports the movable body 3 through the gimbal mechanism 4, a shake correction drive mechanism 6 structured to swing the movable body 3 with respect to the fixed body 5, a first flexible printed circuit board 7 which is connected with the movable body 3, and a second flexible printed circuit board 8 which is attached to the fixed body 5. The first flexible printed circuit board 7 includes a connector part provided at an end part on an opposite side to a side connected with the movable body 3. Further, the second flexible printed circuit board 8 includes a terminal part provided at an end part on an opposite side to a side attached to the fixed body 5.

The optical unit 1 with a shake correction function performs a shake correction by swinging the movable body 3 around two axes ("X"-axis and "Y"-axis) which intersect the optical axis "L" ("Z"-axis) and intersect each other. A shake correction around the "X"-axis and a shake correction around the "Y"-axis are performed and thereby a shake correction in a pitching (vertical swing) direction and a shake correction in a yawing (lateral swing) direction are performed.

As shown in FIGS. 1 and 4, the movable body 3 is swingably supported around a first axial line "R1" perpendicular to the optical axis "L" ("Z"-axis) and is swingably supported around a second axial line "R2" perpendicular to the optical axis "L" and the first axial line "R1" by the gimbal mechanism 4. The first axial line "R1" and the second axial line "R2" are inclined by 45 degrees with respect to the "X"-axis and the "Y"-axis. When turning around the first axial line "R1" and turning around the second axial line "R2" are combined, the movable body 3 can be swung around the "X"-axis and around the "Y"-axis. Therefore, the movable body 3 is swingably supported around the "X"-axis and around the "Y"-axis by the gimbal mechanism 4.

As shown in FIG. 4, the gimbal mechanism 4 includes first supporting point parts 41 provided at diagonal positions on the first axial line "R1" of the movable body 3, second supporting point parts 42 provided at diagonal positions on the second axial line "R2" of the fixed body 5, and a gimbal frame 9. The gimbal frame 9 is a plate spring made of metal and is provided with two first support parts 901 provided at diagonal positions on the first axial line "R1" and two second support parts 902 provided at diagonal positions on the second axial line "R2". The gimbal mechanism 4 is assembled so that the first support part 901 is point-contacted with the first supporting point part 41 and the second support part 902 is point-contacted with the second supporting point part 42. As a result, the movable body 3 is swingably supported around the first axial line "R1" and swingably supported around the second axial line "R2" through the gimbal frame 9.

As shown in FIGS. 2 through 4, the shake correction drive mechanism 6 includes a first magnetic drive mechanism 6X structured to turn the movable body 3 around the "X"-axis and a second magnetic drive mechanism 6Y structured to turn the movable body 3 around the "Y"-axis. The first magnetic drive mechanism 6X includes one set of a magnet 61X and a coil 62X. Further, the second magnetic drive mechanism 6Y includes one set of a magnet 61Y and a coil 62Y. The magnet 61X and the coil 62X of the first magnetic drive mechanism 6X face each other in the "Y"-axis direction. The magnet 61Y and the coil 62Y of the second magnetic drive mechanism 6Y face each other in the "X"-axis direction. In this embodiment, the magnets 61X and 61Y are disposed on the movable body 3 and the coils 62X and 62Y are disposed on the fixed body 5. The arrangement of the magnets 61X and 61Y and the coils 62X and 62Y may be reversed to this embodiment. In other words, it may be structured that the magnets 61X and 61Y are disposed on the fixed body 5 and the coils 62X and 62Y are disposed on the movable body 3.

The first magnetic drive mechanism 6X is disposed on a side face in the "−Y" direction of the movable body 3. Further, the second magnetic drive mechanism 6Y is disposed on a side face in the "+X" direction of the movable body 3. Further, the first flexible printed circuit board 7 connected with the movable body 3 is extended through a side face in the "+Y" direction of an outer peripheral face of the movable body 3 where the first magnetic drive mechanism 6X and the second magnetic drive mechanism 6Y are not disposed. In this embodiment, as described below, a first folded portion 71 formed by bending the first flexible printed circuit board 7 to the "+Z" direction and then folding back to the reverse direction is disposed on a side face in the "+Y" direction of the movable body 3.

(Movable Body)

As shown in FIGS. 2 and 3, the movable body 3 includes the optical module 2 and a holder 30 which holds the optical module 2. The optical module 2 includes a rectangular housing 20 when viewed in the optical axis "L" direction, a circuit board 25 disposed at an end part in the "−Z" direction of the housing 20, a tube part 26 protruded to the "+Z" direction from the housing 20, a lens group 2A (optical element) held by the tube part 26, and a lens drive mechanism 27 (see FIGS. 4 and 5) disposed on an inside of the housing 20. An imaging element (not shown) is mounted on the circuit board 25. The optical module 2 in this embodiment is a camera module which includes the lens group 2A, the lens drive mechanism 27 and the imaging element.

The lens drive mechanism 27 performs focusing for an object to be photographed by adjusting a lens position of the lens group 2A arranged in the optical axis "L" direction. In this embodiment, the lens drive mechanism 27 includes a magnetic drive mechanism. In accordance with an embodiment of the present disclosure, the lens drive mechanism 27 may include a drive source other than the magnetic drive mechanism. For example, the lens drive mechanism 27 may include a motor. The lens drive mechanism 27 is disposed on an opposite side to the first magnetic drive mechanism 6X or the second magnetic drive mechanism 6Y with the optical axis "L" interposed therebetween. In this embodiment, the lens drive mechanism 27 is disposed on an opposite side to the first magnetic drive mechanism 6X with the optical axis "L" interposed therebetween.

The holder 30 is a frame-shaped member surrounding an outer peripheral side of the optical module 2. The housing 20 is provided with a first side face 21 facing the "+X" direction, a second side face 22 facing the "−X" direction, a third side face 23 facing the "+Y" direction, and a fourth side face 24 facing the "−Y" direction. The holder 30 is provided with a first frame part 31 along the first side face 21 of the housing 20, a second frame part 32 along the second side face 22, a third frame part 33 along the third side face 23, and a fourth frame part 34 along the fourth side face 24. The first frame part 31, the second frame part 32 and the fourth frame part 34 are abutted with the housing 20. On the other hand, a space "S" is provided between the third frame part 33 and the third side face 23 of the housing 20 (see FIG. 5). Further, the third frame part 33 is provided with a cut-out part 35 which is formed by cutting out an end part in the "−Z" direction of the third frame part 33 toward the "+Z" direction. The first flexible printed circuit board 7 is formed with the first folded portion 71 which is disposed along the third side face 23 of the housing 20 and then, the first flexible printed circuit board 7 is bent to the "+Y" direction and is extended to an outer side of the holder 30 through the cut-out part 35.

The first folded portion 71 formed by folding back the first flexible printed circuit board 7 once is disposed in the space "S" provided between the third frame part 33 and the third side face 23 of the housing 20. The first folded portion 71 is extended in the "Z"-axis (optical axis "L") direction along the side face in the "+Y" direction of the housing 20. The first flexible printed circuit board 7 is bent at a substantially right angle at an end part in the "−Z" direction of the first folded portion 71 and is passed through the cut-out part 35 provided in the third frame part 33 and is extended to the "+Y" direction side from the holder 30.

As shown in FIGS. 2 and 3, the holder 30 includes first supporting point parts 41 of the gimbal mechanism 4. In this embodiment, the first supporting point parts 41 are respectively provided at two positions on an inner face of a corner part where the second frame part 32 and the third frame part 33 are connected with each other, and on an inner face of a corner part where the first frame part 31 and the fourth frame part 34 are connected with each other. The first supporting point part 41 includes a recessed part 43 which is recessed to an outer side in a radial direction and a first thrust receiving member 44 which is disposed on the recessed part 43. As shown in FIG. 6, the first thrust receiving member 44 is provided with a first plate part 441 in a plate shape extended in the "Z"-axis (optical axis "L") direction and a second plate part 442 which is bent at a substantially right angle from an end part in the "−Z" direction of the first plate part 441 and is extended to an inner side in the radial direction. When the second plate part 442 is abutted in the "Z"-axis (optical axis "L") direction with an inner face in the "−Z" direction of the recessed part 43 provided in the holder 30, the first supporting point part 41 is positioned in the "Z"-axis (optical axis "L") direction.

As shown in FIG. 6, the first thrust receiving member 44 is provided with a through-hole 443 which penetrates through the first plate part 441, and a spherical body 444 is fixed to the through-hole 443 from an inner side in the radial direction. The first thrust receiving member 44 is made of metal and the spherical body 444 is fixed to the first plate part 441 by welding. The spherical body 444 is point-contacted with the first support part 901 which is provided in the gimbal frame 9. The first support part 901 is a concave curved face whose curvature radius is larger than a radius of the spherical body 444 and is resiliently contacted with the spherical body 444 from an inner side in the radial direction.

The holder 30 is provided with protruded parts 36 which are protruded from end faces in the "+Z" direction of the first frame part 31, the second frame part 32, the third frame part 33 and the fourth frame part 34. The protruded parts 36 are respectively provided at one position at the center in the "Y"-axis direction of the first frame part 31 and the second frame part 32, and at the center in the "X"-axis direction of the third frame part 33 and the fourth frame part 34. The protruded parts 36 provided at four positions have the same protruded height to the "+Z" direction. The protruded parts 36 function as a stopper which restricts a swing range around the first axial line "R1" and around the second axial line "R2" of the movable body 3. In other words, when the movable body 3 is swung around the first axial line "R1" and around the second axial line "R2", the protruded part 36 is abutted with the first cover 51 of the fixed body 5 to restrict a swing range of the movable body 3.

A corner part 38 which surrounds the recessed part 43 structuring the first supporting point part 41 of the gimbal mechanism 4 from an outer side in the radial direction is provided at diagonal positions in the first axial line "R1" direction of the holder 30. The corner parts 38 face the first cover 51 in the optical axis "L" direction at diagonal positions in the first axial line "R1" direction. The corner part 38 is located on an outer side in the radial direction with respect to the gimbal frame 9 and is located on the "−Z" direction side with respect to the protruded part 36. When the movable body 3 is to be swung around the second axial line "R2", a swing range of the movable body 3 is restricted by abutting the corner part 38 with the first cover 51.

The holder 30 is provided with magnet disposing recessed parts 37 on which a magnet 61X of the first magnetic drive mechanism 6X and a magnet 61Y of the second magnetic drive mechanism 6Y are disposed. In this embodiment, the magnet disposing recessed part 37 is formed in the first frame part 31 and the fourth frame part 34. The magnet disposing recessed part 37 is recessed to an inner side in the radial direction. In this embodiment, the holder 30 is made of resin and thus, a yoke member 63 in a plate shape is disposed in the magnet disposing recessed part 37. The yoke members 63 are fixed to inner faces of the magnet disposing recessed parts 37, and the magnets 61X and 61Y are fixed to outer side faces in the radial direction of the yoke member 63. Each of the magnets 61X and 61Y is magnetized so that magnets of an outer side face in the radial direction are different from each other with a magnetized polarizing line located at a substantially center in the "Z"-axis (optical axis "L") direction as a boundary.

(Fixed Body)

The fixed body 5 includes a case 50, a first cover 51 and a second cover 52 which are fixed to the case 50, and a wiring cover 53. In this embodiment, the case 50 is made of resin, and the first cover 51, the second cover 52 and the wiring cover 53 are made of nonmagnetic metal. The case 50 is provided with an outer frame part 50A surrounding an outer peripheral side of the movable body 3, a wiring accommodation part 50B protruded from a portion on the "−Z" direction side of the outer frame part 50A to the "+Y" direction, and a projecting part 50C which is projected from an end part on the "−Z" direction side (image side) of the outer frame part 50A to an inner peripheral side. The first cover 51 is fixed to an end part in the "+Z" direction of the outer frame part 50A. The second cover 52 is fixed to an end part in the "−Z" direction of the projecting part 50C and the wiring accommodation part 50B. The wiring cover 53 is fixed to an end part in the "+Z" direction of the wiring accommodation part 50B.

Elastic engaging parts 58 are provided at outer circumferential edges of the first cover 51, the second cover 52 and the wiring cover 53. Further, claw parts 59 are provided on an outer peripheral face of the case 50. The elastic engaging part 58 is a metal piece extending in the "Z"-axis (optical axis "L") direction and is provided with an opening part to which the claw part 59 is fitted. The claw part 59 is protruded to an outer side in the radial direction from an inner face of the recessed part formed on an outer peripheral face of the case 50. The first cover 51, the second cover 52 and the wiring cover 53 are fixed to the case 50 by engaging the elastic engaging parts 58 with the claw parts 59. Further, the first cover 51 is provided with an abutting part 57 which is bent at a substantially right angle from an edge in the "+Y" direction and is extended to the "−Z" direction. The abutting part 57 is abutted with the third frame part 503 of the outer frame part 50A from an outer peripheral side (from "+Y" direction).

The first cover 51 faces an outer peripheral portion of the movable body 3 which is disposed on an inner side of the outer frame part 50A in the "Z"-axis direction and thereby, protrusion of the movable body 3 to the "+Z" direction is restricted. The first cover 51 is provided with an opening part 510 formed in a substantially rectangular shape. In this embodiment, a part of the gimbal frame 9 is protruded to the "+Z" direction through the opening part 510. Further, the tube part 26 of the optical module 2 is protruded to the "+Z" direction through a center hole 90 provided at a center in the radial direction of the gimbal frame 9. The first cover 51 is located at an end part in the "+Z" direction of the fixed body 5. Therefore, in this embodiment, parts of the optical module 2 and the gimbal frame 9 are protruded to the "+Z" direction side with respect to the end part in the "+Z" direction of the fixed body 5.

The outer frame part 50A is provided with a first frame part 501 and a second frame part 502, which are extended parallel to the "Y"-axis direction on the "+X" direction side and the "−X" direction side of the movable body 3, and a third frame part 503 and a fourth frame part 504 which are extended parallel to the "X"-axis direction on the "+Y" direction side and the "−Y" direction side of the movable body 3. The wiring accommodation part 50B is provided with a fifth frame part 505 and a sixth frame part 506, which are extended parallel to the "+Y" direction from end parts in the "−Z" direction of the first frame part 501 and the second frame part 502, and a seventh frame part 507 extended in the "X"-axis direction which is connected with end parts in the "+Y" direction of the fifth frame part 505 and the sixth frame part 506.

The outer frame part 50A is provided with a cut-out part 508 which is formed by cutting out an end part in the "−Z" direction of the third frame part 503 to the "+Z" direction. The first flexible printed circuit board 7 is extended to an inner side of the wiring accommodation part 50B through the cut-out part 508. The first flexible printed circuit board 7 is provided with a second folded portion 72 which is extended to the "+Y" direction on an inner side of the wiring accommodation part 50B and is folded back once to the reverse direction, and a third folded portion 73 overlapped with the second folded portion 72 on the "+Z" direction side.

The wiring cover 53 is provided with a cut-out part 531 which is formed by cutting out a substantially center of an edge in the "−Y" direction to the "+Y" direction. The third folded portion 73 of the first flexible printed circuit board 7 is extended to an outer side of the wiring accommodation part 50B through the cut-out part 531 and is extended to the "+Y" direction side along the wiring cover 53. The first flexible printed circuit board 7 includes a fixing part 74 which is fixed to the wiring cover 53. The fixing part 74 is fixed to an edge of the cut-out part 531.

The first flexible printed circuit board 7 includes a flexible circuit board 70 and reinforcing plates 75 which are fixed to the flexible circuit board 70. The reinforcing plate 75 is disposed in the first folded portion 71 and the second folded portion 72 and is sandwiched by the flexible circuit board 70 which is bent and folded to function as a spacer. Further, the reinforcing plate 75 provided in the fixing part 74 is disposed between the wiring cover 53 and the flexible circuit board 70 and functions as a spacer between the wiring cover 53 and the flexible circuit board 70.

An inner side face of the outer frame part 50A is provided with the second supporting point parts 42 of the gimbal mechanism 4. In this embodiment, the second supporting point parts 42 are provided at two positions respectively on an inner face of a corner part where the first frame part 501 and the third frame part 503 are connected with each other and on an inner face of a corner part where the second frame part 502 and the fourth frame part 504 are connected with each other. The second supporting point part 42 includes a recessed part 45 which is recessed to an outer side in the radial direction and a second thrust receiving member 46 which is disposed in the recessed part 45. As shown in FIG. 6, the second thrust receiving member 46 is provided with a first plate part 461 extending in the optical axis "L" direction and a second plate part 462 which is bent at a substantially right angle from an end part in the "−Z" direction of the first plate part 461 and is extended to an inner side in the radial direction. The second plate part 462 is abutted in the "Z"-axis (optical axis "L") direction with an inner face in the "−Z" direction of the recessed part 45 provided in the outer frame part 50A and thereby, the second supporting point part 42 is positioned in the "Z"-axis (optical axis "L") direction.

As shown in FIG. 6, the second thrust receiving member 46 is provided with a through-hole 463 which penetrates through the first plate part 461, and a spherical body 464 is fixed to the through-hole 463 from an inner side in the radial direction. The second thrust receiving member 46 is made of metal and the spherical body 464 is fixed to the first plate part 461 by welding. The spherical body 464 is point-contacted with the second support part 902 provided in the gimbal frame 9. The second support part 902 is a concave curved face whose curvature radius is larger than a radius of the spherical body 464 and is resiliently contacted with the spherical body 464 from an inner side in the radial direction.

The outer frame part 50A is provided with coil arrangement holes 54 to which the coil 62X of the first magnetic drive mechanism 6X and the coil 62Y of the second magnetic drive mechanism 6Y are fixed with an adhesive or the like. In this embodiment, the coil arrangement holes 54 are penetrated through the first frame part 501 and the fourth frame part 504. Each of the coils 62X and 62Y is an air core coil in an elliptical shape, and two long sides located on the "+Z" direction side and the "−Z" direction side are utilized as effective sides. A second flexible printed circuit board 8 is fixed to the first frame part 501 and the fourth frame part 504 of the outer frame part 50A from an outer side in the radial direction. The second flexible printed circuit board 8 is provided with a first circuit board portion 81, which is overlapped with the coil arrangement hole 54 of the fourth frame part 504 from an outer side in the radial direction, and a second circuit board portion 82 which is overlapped with the coil arrangement hole 54 of the first frame part 501 from an outer side in the radial direction.

Rectangular magnetic plates 64 are respectively disposed between the first circuit board portion 81 and the coil 62X and between the second circuit board portion 82 and the coil 62Y. The magnetic plate 64 disposed between the first circuit board portion 81 and the coil 62X faces the magnet 61X, and a magnetic spring for returning the movable body 3 to a turning reference position in a turning direction around the "X"-axis is structured. Further, the magnetic plate 64 disposed between the second circuit board portion 82 and the coil 62Y faces the magnet 61Y, and a magnetic spring for returning the movable body 3 to a turning reference position in a turning direction around the "Y"-axis is structured.

The magnetic plates 64 are provided with rectangular through holes at positions overlapping with center holes of the coils 62X and 62Y, and a magnetic sensor 65 is disposed in each of the through holes. The magnetic sensor 65 is, for example, a Hall element. The optical unit 1 with a shake correction function detects a swing angle around the "X"-axis of the movable body 3 based on an output of the magnetic sensor 65 disposed at the center of the coil 62X. Further, the optical unit 1 with a shake correction function detects a swing angle around the "Y"-axis of the movable body 3 based on an output of the magnetic sensor 65 disposed at the center of the coil 62Y.

(Gimbal Frame)

As shown in FIG. 6, the gimbal frame 9 is provided with a first frame portion 91 in a substantially square shape when viewed in the "Z"-axis direction and second frame portions 92 which are bent from four corner parts of the first frame portion 91 at a substantially right angle and are extended to the "−Z" direction. The second frame portions 92 are disposed at first diagonal positions on both sides in the first axial line "R1" direction of the first frame portion 91 and second diagonal positions on both sides in the second axial line "R2" direction of the first frame portion 91. A center of the first frame portion 91 is provided with a center hole 90 penetrated through the first frame portion 91.

The first frame portion 91 is provided with a rectangular portion 910 in a square shape whose diagonal directions are the first axial line "R1" direction and the second axial line "R2" direction when viewed in the "Z"-axis (optical axis "L") direction, first protruded portions 913 which are protruded from corner parts on both sides in the first axial line "R1" direction of the rectangular portion 910 to an outer side in the radial direction, and second protruded portions 914 which are protruded from corner parts on both sides in the second axial line "R2" direction of the rectangular portion 910 to an outer side in the radial direction.

As shown in FIGS. 1 and 6, a center portion 911 of the rectangular portion 910 of the first frame portion 91 located at a center in the second axial line "R2" direction is recessed to the "−Z" direction, and corner portions 912 at both ends in the second axial line "R2" direction are located on the "+Z" direction side with respect to the center portion 911. In other words, the corner portions 912 in the second axial line "R2" direction of the first frame portion 91 are separated from the movable body 3 with respect to the center portion 911. Therefore, even when the movable body 3 is swung around the first axial line "R1" on the "−Z" direction side with respect to the gimbal frame 9 and both ends in the second axial line "R2" direction of the movable body 3 (in this embodiment, the corner parts in the second axial line "R2" direction of the housing 20) are moved in the "Z"-axis direction, a collision of the movable body 3 with the gimbal frame 9 can be avoided.

Further, the center portion 911 is extended to corner parts in the first axial line "R1" direction of the first frame portion 91. The corner parts in the first axial line "R1" direction of the first frame portion 91 are portions of the gimbal frame 9 which are moved largest in the "Z"-axis (optical axis "L") direction in a case that the movable body 3 is swung around the second axial line "R2" and the gimbal frame 9 is swung around the second axial line "R2" with the second supporting point parts 42 as a turning center. As described above, in a case that the corner parts in the first axial line "R1" direction of the first frame portion 91 are formed in the most recessed shape to the "−Z" direction, an operation space of the gimbal frame 9 when the movable body 3 is swung can be reduced in the "Z"-axis (optical axis "L") direction. Therefore, a height of a space for disposing the optical unit 1 with a shake correction function required in the "Z"-axis (optical axis "L") direction can be reduced.

The second frame portion 92 is provided with first support part extended parts 93, which are provided at two corner parts on the first axial line "R1" of the gimbal frame 9, and second support part extended parts 94 provided at two corner parts on the second axial line "R2" of the gimbal frame 9. The first support part extended part 93 is extended to the "−Z" direction in a straight line shape from the first protruded portion 913 of the first frame portion 91. A tip end portion of the first support part extended part 93 is formed with a first support part 901 which is a concave curved face recessed to an inner side in the radial direction by press working. The second support part extended part 94 is provided with a first portion 941 extended to the "−Z" direction from the second protruded portion 914 of the first frame portion 91, a second portion 942 which is bent at a substantially right angle from the first portion 941 and is extended to an outer side in the radial direction, and a third portion 943 which is bent at a substantially right angle from the second portion 942 and is extended to the "−Z" direction. A tip end portion of the third portion 943 is formed with a second support part 902 which is a concave curved face recessed to an inner side in the radial direction by press working.

The first support part extended part 93 is disposed in a cut-out part 511 which is formed by cutting out a corner part in the first axial line "R1" direction of the opening part 510 of the first cover 51 to an outer side in the radial direction. The first supporting point part 41 which is provided on the movable body 3 side and is a supporting point part of the gimbal mechanism 4 is disposed on the "−Z" direction side with respect to the cut-out part 511, and a tip end part of the first support part extended part 93 is supported by the first supporting point part 41. Further, the second support part extended part 94 is disposed in a cut-out part 512 which is formed by cutting out a corner part in the second axial line "R2" direction of the opening part 510 of the first cover 51 to an outer side in the radial direction. The second supporting point part 42 which is provided on the fixed body 5 side and is a supporting point part of the gimbal mechanism 4 is disposed on the "−Z" direction side with respect to the cut-out part 512, and a tip end part of the second support part extended part 94 is supported by the second supporting point part 42.

Each of the first support part extended part 93 and the second support part extended part 94 is elastically deformed in the radial direction. Therefore, the first support part 901 provided at the tip end part of the first support part extended part 93 is elastically contacted with the spherical body 444 provided in the first supporting point part 41. Further, the second support part 902 provided at the tip end part of the second support part extended part 94 is elastically contacted with the spherical body 464 provided in the second supporting point part 42. As a result, the first support part extended part 93 and the second support part extended part 94 are hard to be disengaged from the first supporting point part 41 and the second supporting point part 42, and deviation of the supporting point part is suppressed.

(Positioning Reference of Optical Module)

FIG. 7 is a bottom view showing the optical unit 1 with a shake correction function in which the second cover 52 is detached. (a) of FIG. 8 is a bottom view showing the fixed body 5 and the holder 30 in which the second cover 52 is detached, and (b) of FIG. 8 is a bottom view showing the optical module 2. (a) and (b) of FIG. 8 and FIG. 9 are views which are viewed from the "−Z" direction (from an image side). FIG. 9 is a perspective view showing the fixed body 5, the holder 30 and the optical module 2 in which the second cover 52 is detached and which is viewed from the "−Z" direction (from an image side). As shown in FIGS. 2 and 9, the optical module 2 is provided with a plurality of protruded parts 28 which are protruded to an outer peripheral side. Further, an inner circumferential edge of an end face on the "−Z" direction of the holder 30 is formed with a plurality of recessed parts 39 which are recessed to the "+Z" direction (object side). As shown in (a) and (b) of FIGS. 8 and 9, when viewed in the "Z"-axis (optical axis "L") direction, the recessed part 39 comprises four first recessed parts 391 provided at positions overlapped with the protruded parts 28 and two second recessed parts 392 which are provided at positions different from the position overlapped with the protruded part 28.

As shown in FIGS. 2 and 9, the protruded parts 28 are protruded from an end part in the "−Z" direction (image side) of the housing 20 to an outer peripheral side. Therefore, the protruded parts 28 are disposed at an end part of the housing 20 which is the nearest to the circuit board 25. The protruded part 28 is formed on two side faces (first side face 21 and second side face 22) of the housing 20 which face opposite sides with the "Z"-axis (optical axis "L") interposed therebetween. An end part in the "−Z" direction of the first side face 21 is formed with the protruded part 28 at two positions separated in the "Y" direction so as to protrude to the "+X" direction. Further, an end part in the "−Z" direction of the second side face 22 is formed with the protruded part 28 at two positions separated in the "Y" direction so as to protrude to the "−X" direction. On the other hand, the first recessed part 391 of the holder 30 is formed at two positions respectively in the first frame part 31 located in the "+X" direction of the housing 20 and in the second frame part 32 located in the "−X" direction of the housing 20. Further, the fourth frame part 34 located in the "−Y" direction of the housing 20 is formed with the second recessed part 392 at two positions separated in the "X" direction.

FIG. 10 is a cross-sectional view showing the optical unit 1 with a shake correction function in FIG. 1 (cross-sectional view which is cut at the "B-B" position in FIG. 7). The holder 30 is provided with a position restriction part 393 which restricts movement of the optical module 2 to the "+Z" direction (object side). In this embodiment, the position restriction part 393 is a bottom face of the first recessed part 391. When the movable body 3 is to be assembled, the housing 20 is inserted into an inner side of the holder 30 from the "−Z" direction (from an image side). In this case, as shown in FIG. 10, the housing 20 is inserted from the "−Z" direction (image side) to a position where the protruded part 28 is abutted with the position restriction part 393 (bottom face of the first recessed part 391). As a result, the optical module 2 is positioned by the holder 30 in the "Z"-axis (optical axis "L") direction. As described above, the movable body 3 is assembled with the protruded part 28 as a positioning reference in the optical axis "L" direction of the optical module 2.

(Bottom Part Shape of Case)

As shown in FIGS. 2 and 9, the case 50 in this embodiment is provided with a projecting part 50C which is projected to an inner peripheral side from an end part in the "−Z" direction side (image side) of the outer frame part 50A surrounding an outer peripheral side of the holder 30. The projecting part 50C is projected to an inner peripheral side from the first frame part 501, the second frame part 502 and the fourth frame part 504 of the outer frame part 50A. An opening part 50D in a substantially rectangular shape is formed on an inner peripheral side of the projecting part 50C. The third frame part 503 located in the "+Y" direction of the opening part 50D is formed with a cut-out part 508 for extending out the first flexible printed circuit board 7. Therefore, the opening part 50D is continuously connected with a space on an inner side of the wiring accommodation part 50B.

As shown in FIG. 7 and (a) of FIG. 8, an inner circumferential edge of the holder 30 is formed to be smaller than the opening part 50D. Therefore, when the case 50 and the holder 30 are viewed in the optical axis "L" direction, the inner circumferential edge of the holder 30 is located on an inner peripheral side of the opening part 50D. On the other hand, an outer peripheral portion of the holder 30 is located on an outer peripheral side of the opening part 50D. Therefore, the projecting part 50C is provided with a stopper part 55 which is overlapped with the holder 30 when viewed in the optical axis "L" direction. The stopper part 55 is a portion of the case 50 on an inner peripheral side with respect to a position of an outer peripheral face of the holder 30 shown by the broken line in FIG. 7. In this embodiment, the case 50 is provided with the stopper part 55 and thus, projecting of the movable body 3 from the case 50 to the "−Z" direction is restricted.

The opening part 50D is closed by the second cover 52 which is fixed to an end part in the "−Z" direction of the case 50. The second cover 52 is engaged with the case 50 by an engagement structure of the elastic engaging parts 58 of the second cover 52 and the claw parts 59 of the case 50, and the second cover 52 is fixed to the projecting part 50C by an adhesive. Therefore, the projecting part 50C is reinforced by the second cover 52. The adhesive is applied to at least the stopper part 55 where the movable body 3 may be collided. As a result, when the movable body 3 is collided with the stopper part 55 due to an impact of falling or the like, a possibility that the stopper part 55 is broken and the projecting part 50C is damaged is reduced. In this embodiment, an adhesive is applied to an entire region of the projecting part 50C to fix the second cover 52, and the entire bottom part of the case 50 is reinforced by the second cover 52.

As shown in FIG. 10, when a thickness in the optical axis "L" direction of the projecting part 50C is set to be "T1" and a thickness in the optical axis "L" direction of the second cover 52 is set to be "T2", the "T2" is smaller than the "T1". The second cover 52 is made of metal and thus, even when the plate thickness is set to be small, its rigidity is high. For example, in a case that the second cover 52 is made of metal, the minimum thickness is 0.1 mm. On the other hand, the case 50 is a resin component, and the minimum thickness capable of being molded is 0.3 mm. Therefore, in a case that the projecting part 50C is to be reinforced, in comparison with a case that the projecting part 50C is reinforced by increasing a plate thickness of the projecting part 50C made of resin, when the second cover 52 made of metal is fixed, a thickness in the optical axis "L" direction of the reinforced portion can be reduced. Accordingly, an increase of a height in the optical axis "L" direction of the optical unit 1 with a shake correction function due to reinforcement can be restrained.

As shown in FIGS. 7 through 9, an inner circumferential edge of the projecting part 50C is formed with a cut-out part 56 which is recessed to an outer peripheral side. The cut-out part 56 comprises a first cut-out part 561, which is cut out in a shape surrounding an outer peripheral side of the first recessed part 391 of the holder 30 when viewed in the "Z"-axis (optical axis "L") direction, and a second cut-out part 562 which is cut out in a shape surrounding an outer peripheral side of the second recessed part 392 of the holder 30 when viewed in the "Z"-axis (optical axis "L") direction. The first cut-out part 561 is formed at two positions at both of an inner circumferential edge on the "+X" direction side and an inner circumferential edge on the "−X" direction side of the projecting part 50C. Further, the second cut-out part 562 is formed at an inner circumferential edge on the "−Y" direction side of the projecting part 50C.

As shown in FIG. 7, the first recessed part 391 and the second recessed part 392 formed in the holder 30 are located on an inner peripheral side with respect to the projecting part 50C when viewed in the optical axis "L" direction. More specifically, the first cut-out part 561 is formed so as to face the first recessed part 391 when viewed in the optical axis "L" direction, and a width in the "Y"-axis direction of the first cut-out part 561 is larger than that of the first recessed part 391 and, in addition, its depth in the "X"-axis direction is larger than that of the first recessed part 391. Therefore, when viewed in the optical axis "L" direction, the inner circumferential edge of the first cut-out part 561 is formed in a shape surrounding an outer peripheral side of the first recessed part 391, and the first recessed part 391 is disposed on an inner side of the first cut-out part 561. Similarly, the second cut-out part 562 is formed so as to face the second recessed part 392 when viewed in the optical axis "L" direction and is formed so that its width in the "X"-axis direction is larger than that of the second recessed part 392 and, in addition, its depth in the "Y"-axis direction is larger than that of the second recessed part 392. Therefore, when viewed in the optical axis "L" direction, the inner circumferential edge of the second cut-out part 562 is formed in a shape surrounding an outer peripheral side of the second recessed part 392, and the second recessed part 392 is disposed on an inner side of the second cut-out part 562.

In this embodiment, when the optical unit 1 with a shake correction function is to be assembled, the holder 30 is disposed on an inner side of the case 50, and the gimbal mechanism 4 and the shake correction drive mechanism 6 are assembled between the case 50 and the holder 30. After that, the optical module 2 is inserted into the holder 30 disposed on an inner side of the case 50 from the "−Z" direction side (image side) and is fixed. After that, the second cover 52 is fixed to the case 50 and the opening part 50D is closed.

The optical module 2 is inserted into an inner side of the case 50 from a side of the projecting part 50C. As described above, the protruded part 28 of the optical module 2 is disposed on an inner peripheral side with respect to the projecting part 50C and thus, the optical module 2 can be inserted into an inner side of the holder 30 without interfering with the projecting part 50C. Further, in this embodiment, the first cut-out part 561 is formed in the projecting part 50C and thus, when the optical module 2 is to be inserted into the inner side of the holder 30, the first protruded part 28 passes the cut-out part 561, and the stopper part 55 and the protruded part 28 do not interfere with each other.

The optical module 2 is fixed to the holder 30 with an adhesive. When the movable body 3 is to be assembled, the first recessed part 391 and the second recessed part 392 of the holder 30 are used as an adhesive reservoir. In this case, the first cut-out part 561 and the second cut-out part 562 provided in the projecting part 50C is used as a window part through which a syringe for applying an adhesive is passed. In other words, when an adhesive is to be applied to the first recessed part 391, a tip end of a syringe is reached the first recessed part 391 by passing the syringe for applying an adhesive through the first cut-out part 561 and the adhesive is applied. Further, when an adhesive is to be applied to the second recessed part 392, a tip end of a syringe is reached the second recessed part 392 by passing the syringe for applying an adhesive through the second cut-out part 562 and the adhesive is applied. In this manner, an adhesive can be applied from an outer side of the projecting part 50C in a state that the holder 30 has been assembled to an inner side of the case 50.

(Principal Operations and Effects in this Embodiment)

As described above, the optical unit 1 with a shake correction function in this embodiment includes the movable body 3 having the optical module 2 and the holder 30 surrounding an outer peripheral side of the optical module 2, the gimbal mechanism 4 which is a swing support mechanism structured to swingably support the movable body 3 around the first axial line "R1" intersecting the optical axis "L" and swingably support the movable body 3 around the second axial line "R2" intersecting the optical axis "L" and the first axial line "R1", the fixed body 5 which supports the movable body 3 through the gimbal mechanism 4 which is the swing support mechanism, and the shake correction drive mechanism 6 structured to swing the movable body 3 around the first axial line "R1" and around the second axial line "R2". The optical module 2 is provided with the protruded part 28 which is protruded to an outer peripheral side, and the holder 30 is provided with the position restriction part 393 which is abutted with the protruded part 28 in the optical axis "L" direction. Further, the fixed body 5 includes the case 50 in which the holder 30 is accommodated, and the case 50 is provided with the outer frame part 50A surrounding an outer peripheral side of the holder 30 and the projecting part 50C which is projected to an inner peripheral side from an end part in the "−Z" direction of the outer frame part 50A (image side in the optical axis "L" direction). Further, the projecting part 50C is provided with the stopper part 55 overlapped with the holder 30 when viewed in the optical axis "L" direction, and the protruded part 28 and the position restriction part 393 are located on an inner peripheral side with respect to the projecting part 50C when viewed in the optical axis "L" direction.

As described above, in this embodiment, the optical module 2 is provided with the protruded part 28 which is protruded to an outer peripheral side, and the holder 30 surrounding the optical module 2 is provided the position restriction part 393 with which the protruded part 28 is abutted in the optical axis "L" direction. Therefore, the protruded part 28 serves as a positioning reference in the optical axis "L" direction of the optical module 2 and thus, positioning in the optical axis "L" direction of the optical module 2 can be performed by a portion different from a top surface of the optical module 2. Accordingly, in comparison with a case that a top surface of the optical module 2 is set as a positioning reference, the positioning reference of the optical module 2 can be brought close to a turning center of the movable body 3. As a result, a variation of a gravity center position of the movable body 3 can be reduced.

Further, the fixed body 5 in this embodiment includes the case 50 which accommodates the holder 30, and the projecting part 50C provided in the case 50 is provided with the stopper part 55, and the protruded part 28 and the position restriction part 393 which serve as a positioning reference are located on an inner peripheral side with respect to the projecting part 50C when viewed in the optical axis "L" direction. As described above, the projecting part 50C functions as a stopper for the holder 30 and, in addition, the projecting part 50C is formed in a shape capable of assembling the optical module 2 into an inner side of the case 50. Therefore, although the optical module 2 is structured to provide with the protruded part 28 as a positioning reference, when the optical module 2 is to be inserted into an inner side of the holder 30 to assemble the movable body 3, interference of the positioning reference (protruded part 28) with the projecting part 50C of the case 50 can be avoided. Accordingly, after the gimbal mechanism 4 which is a swing support mechanism and the shake correction drive mechanism 6 have been assembled between the case 50 and the holder 30, the optical module 2 can be inserted into the case 50 from a side of the projecting part 50C and is fixed to the holder 30 and, in this manner, the optical unit 1 with a shake correction function can be assembled.

In this embodiment, an inner circumferential edge of the projecting part 50C is provided with the first cut-out part 561 which is recessed to an outer peripheral side, and the protruded part 28 and the position restriction part 393 are located on an inner side with respect to the first cut-out part 561 so as to face the first cut-out part 561 when viewed in the optical axis "L" direction. More specifically, a tip end part on an outer peripheral side of the protruded part 28 and an end part on an outer peripheral side of the first recessed part 391 where the position restriction part 393 is provided are disposed in the opening part of the first cut-out part 561, and a space is secured between the protruded part 28 and the projecting part 50C by providing the first cut-out part 561. Therefore, even in a case that the projecting part 50C is projected to an inner peripheral side of the case 50, when the optical module 2 is to be inserted into an inner side of the case 50, interference of the protruded part 28 with the projecting part 50C can be avoided. Accordingly, the optical module 2 can be inserted into an inside of the case 50 from a side of the projecting part 50C, and the optical module 2 can be positioned by abutting the protruded part 28 with the position restriction part 393.

In this embodiment, an inner circumferential edge of the holder 30 is provided with the recessed part 39 which is recessed in the optical axis "L" direction, and the recessed part 39 is located on an inner peripheral side with respect to the projecting part 50C when viewed in the optical axis "L" direction. Further, the recessed part 39 serves as an adhesive reservoir, and the optical module 2 is fixed to the holder 30 by an adhesive applied to the recessed part 39. As described above, an adhesive reservoir (recessed part 39) is provided on an inner peripheral side with respect to the projecting part 50C and thus, when an adhesive is to be applied to the recessed part 39, a syringe for applying the adhesive can be passed through the opening part 50D of the projecting part 50C to make a front end of the syringe reach the recessed part 39. Therefore, the adhesive can be applied to the adhesive reservoir (recessed part 39) from an outer side of the case 50.

In this embodiment, the recessed part 39 comprises the first recessed part 391 and the second recessed part 392 provided at a position different from the first recessed part 391. The first recessed part 391 is located on an inner side with respect to the first cut-out part 561 so as to face first cut-out part 561 when viewed in the optical axis "L" direction, and the position restriction part 393 is provided in a bottom face of the first recessed part 391. According to this structure, the first cut-out part 561 for avoiding interference of the protruded part 28 with the projecting part 50C can be utilized as a window part for passing the syringe for applying an adhesive. Therefore, an adhesive can be applied to the first recessed part 391 from an outer side of the case 50. Further, the position restriction part 393 and the adhesive reservoir can be disposed at the same position and thus, a component shape is capable of avoiding being complicated.

In this embodiment, an inner circumferential edge of the projecting part 50C is provided with the second cut-out part 562 which is recessed to an outer peripheral side, and the second recessed part 392 is located on an inner side with respect to the second cut-out part 562 so as to face the second cut-out part 562 when viewed in the optical axis "L" direction. More specifically, an end part on an outer peripheral side of the second recessed part 392 is disposed in an opening part of the second cut-out part 562, and a space is secured between the second recessed part 392 and the projecting part 50C by providing the second cut-out part 562. Therefore, an adhesive can be applied from an outer side of the case 50 to the second recessed part 392 by passing a syringe for applying an adhesive through the second cut-out part 562.

In this embodiment, the optical module 2 includes the lens group 2A which is an optical element, the housing 20 which accommodates the lens group 2A, and the circuit board 25 disposed at an end part in the "–Z" direction of the housing 20 (image side in the optical axis "L" direction), and the protruded part 28 is protruded from an end part on the circuit board 25 side of the housing 20 to an outer peripheral side. As described above, when the protruded part 28 which serves as a positioning reference is disposed at a position close to the circuit board 25, the positioning reference can be brought close to a turning center of the movable body 3. Therefore, a variation of a gravity center position of the movable body 3 can be reduced.

In this embodiment, the fixed body 5 includes the second cover 52 which is fixed to the projecting part 50C, and a region of the projecting part 50C including at least the stopper part 55 is adhesively bonded to the second cover 52. As described above, when the second cover 52 is adhesively bonded to the stopper part 55, the stopper part 55 can be reinforced and rigidity of a portion where the movable body 3 may be collided can be increased. In this embodiment, the entire bottom face of the case 50 is reinforced by the second cover 52. Therefore, a possibility that the projecting part 50C is damaged by an impact due to a collision of the movable body 3 with the stopper part 55 at the time of dropping or the like can be reduced. Accordingly, impact resistance of the optical unit 1 with a shake correction function can be enhanced.

While the description above refers to particular embodiments of the present disclosure, it will be understood that many modifications may be made without departing from the spirit thereof. The accompanying claims are intended to cover such modifications as would fall within the true scope and spirit of the present disclosure.

The presently disclosed embodiments are therefore to be considered in all respects as illustrative and not restrictive, the scope of the disclosure being indicated by the appended claims, rather than the foregoing description, and all changes which come within the meaning and range of equivalency of the claims are therefore intended to be embraced therein.

What is claimed is:

1. An optical unit with a shake correction function comprising:
    a movable body comprising an optical module and a holder surrounding an outer peripheral side of the optical module;
    a swing support mechanism structured to swingably support the movable body around a first axial line intersecting an optical axis and swingably support the movable body around a second axial line intersecting the optical axis and the first axial line;
    a fixed body which supports the movable body through the swing support mechanism; and
    a shake correction drive mechanism structured to swing the movable body around the first axial line and around the second axial line;
    wherein the optical module comprises a protruded part protruding to an outer peripheral side;
    wherein the holder comprises a position restriction part with which the protruded part is abutted in an optical axis direction;
    wherein the fixed body comprises a case which accommodates the holder;
    wherein the case comprises an outer frame part surrounding an outer peripheral side of the holder and a projecting part projecting to an inner peripheral side from an end part on an image side in the optical axis direction of the outer frame part;
    wherein the projecting part comprises a stopper part overlapping with the holder when viewed in the optical axis direction; and
    wherein the protruded part and the position restriction part are located on an inner peripheral side with respect to the projecting part when viewed in the optical axis direction.

2. The optical unit with a shake correction function according to claim 1, wherein
    an inner circumferential edge of the projecting part comprises a first cut-out part which is recessed to an outer peripheral side, and
    the protruded part and the position restriction part are located on an inner side with respect to the first cut-out part when viewed in the optical axis direction.

3. The optical unit with a shake correction function according to claim 2, wherein
    an inner circumferential edge of the holder comprises a recessed part which is recessed in the optical axis direction,
    the recessed part is located on an inner peripheral side with respect to the projecting part when viewed in the optical axis direction, and
    the recessed part serves as an adhesive reservoir to which an adhesive for fixing the optical module to the holder is applied.

4. The optical unit with a shake correction function according to claim 3, wherein
    the recessed part comprises a first recessed part and a second recessed part which is provided at a position different from the first recessed part,
    the first recessed part is located on an inner side with respect to the first cut-out part when viewed in the optical axis direction, and the position restriction part is provided in the first recessed part.

5. The optical unit with a shake correction function according to claim 4, wherein
an inner circumferential edge of the projecting part comprises a second cut-out part which is recessed to an outer peripheral side, and
the second recessed part is located on an inner side with respect to the second cut-out part when viewed in the optical axis direction.

6. The optical unit with a shake correction function according to claim 1, wherein
the optical module comprises:
an optical element;
a housing which accommodates the optical element; and
a circuit board which is fixed to an end part on an image side in the optical axis direction of the housing, and
the protruded part is protruded from an end part on a circuit board side of the housing to an outer peripheral side.

7. The optical unit with a shake correction function according to claim 6, wherein
an inner circumferential edge of the projecting part comprises a first cut-out part which is recessed to an outer peripheral side, and
the protruded part and the position restriction part are located on an inner side with respect to the first cut-out part so as to face the first cut-out part when viewed in the optical axis direction.

8. The optical unit with a shake correction function according to claim 7, wherein
an inner circumferential edge of the holder comprises a recessed part which is recessed in the optical axis direction,
the recessed part is located on an inner peripheral side with respect to the projecting part when viewed in the optical axis direction, and
the recessed part serves as an adhesive reservoir to which an adhesive for fixing the optical module to the holder is applied.

9. The optical unit with a shake correction function according to claim 8, wherein
the recessed part comprises a first recessed part and a second recessed part which is provided at a position different from the first recessed part,
the first recessed part is located on an inner side with respect to the first cut-out part so as to face the first cut-out part when viewed in the optical axis direction, and
the position restriction part is provided in a bottom face of the first recessed part.

10. The optical unit with a shake correction function according to claim 9, wherein
an inner circumferential edge of the projecting part comprises a second cut-out part which is recessed to an outer peripheral side, and
the second recessed part is located on an inner side with respect to the second cut-out part so as to face the second cut-out part when viewed in the optical axis direction.

11. The optical unit with a shake correction function according to claim 1, wherein
the fixed body comprises a cover which is fixed to the projecting part, and
the projecting part is adhesively bonded to the cover in a region including at least the stopper part.

* * * * *